March 26, 1935.  H. C. FIEGE  1,995,769
WINDSHIELD HEATER
Original Filed March 1, 1930
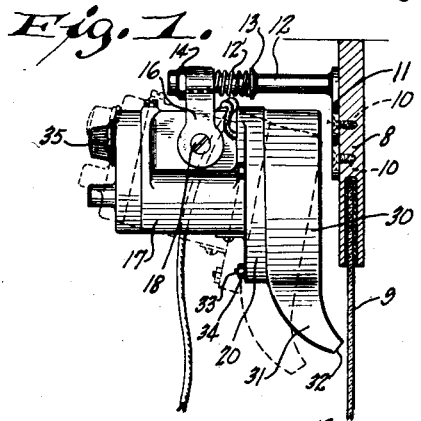
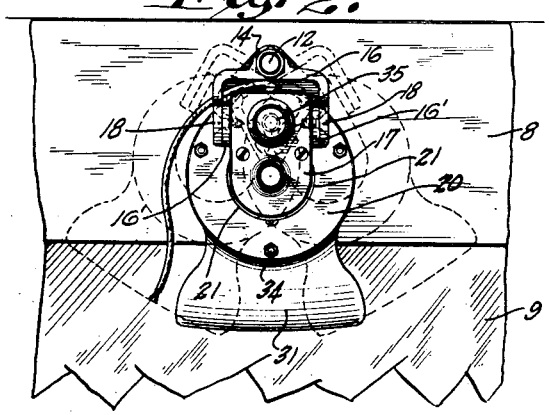
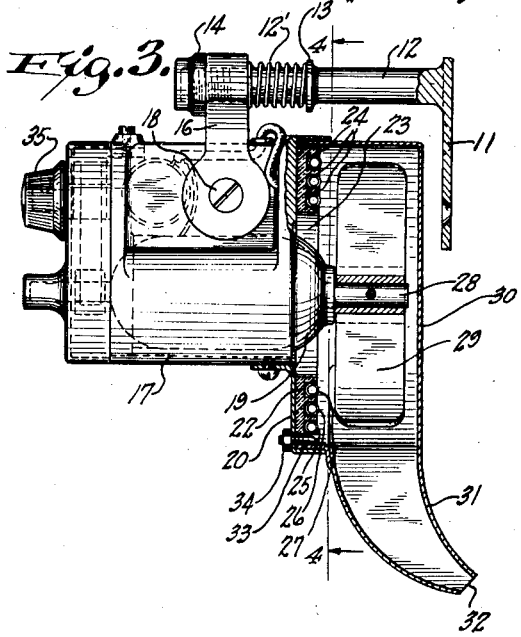
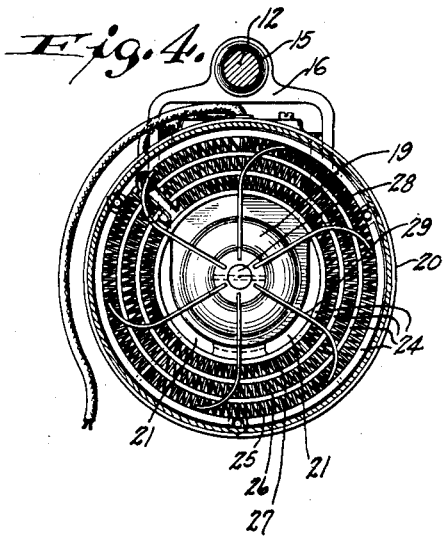
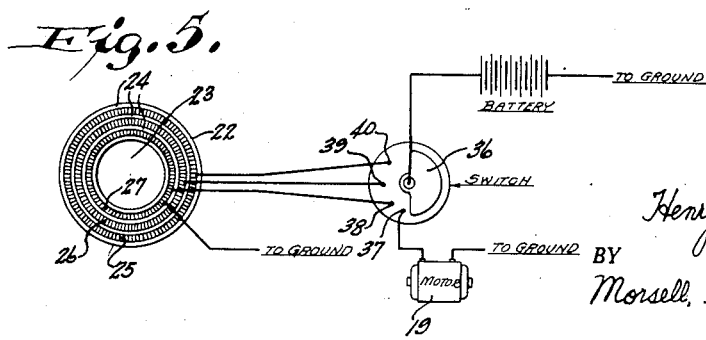
INVENTOR.
Henry C. Fiege,
BY
Morsell, Keeney & Morsell
ATTORNEYS Patented Mar. 26, 1935

1,995,769

UNITED STATES PATENT OFFICE 1,995,769

WINDSHIELD HEATER

Henry C. Fiege, Green Bay, Wis.

Application March 1, 1930, Serial No. 432,402
Renewed January 17, 1935

3 Claims. (Cl. 219—19)

This invention relates to improvements in windshield heaters.

It is one of the objects of this invention to provide an improved windshield heater which is designed to effectively circulate heated air adjacent the windshield of a vehicle to dispel and prevent formation of frost and condensation on the glass, so that the driver's vision will not be impaired.

A further object of this invention is to provide a windshield heater employing a heat producing unit and a circulating fan, in which said elements are compactly arranged in an attractive casing, and in which the relative arrangement of the heat unit and the fan is such that the heat radiated from the unit is immediately circulated adjacent the windshield before the heated air currents have had an opportunity to cool.

A further object of this invention is to provide a windshield heater having an adjustably mounted casing to permit the discharge of the heated air currents in any desired direction.

A further object of this invention is to provide an improved windshield heater which is simple in construction, and well adapted for the purpose described.

With the above and other objects in view, the invention consists of the improved windshield heater, and all its parts and combinations, as set forth in the claims, and all equivalents thereof.

In the accompanying drawing, illustrating one complete embodiment of the preferred form of the invention, in which the same reference numerals designate the same parts in all of the views:

Fig. 1 is a side view of the improved heater showing it in connection with a windshield, the dotted lines indicating a position of adjustment;

Fig. 2 is a front elevation thereof, the dotted lines indicating other positions of adjustment;

Fig. 3 is an enlarged side view of the device, parts being broken away, and parts being shown in section;

Fig. 4 is a sectional view taken on line 4—4 of Fig. 3; and

Fig. 5 is a diagrammatic view showing the wiring arrangement.

Referring to the drawing, the numeral 8 designates an upper frame portion for a vehicle windshield 9. Secured to the inner portion of said frame by suitable fastening means 10 is a bracket 11. Extending outwardly from said bracket is a rod 12 having an intermediately positioned collar 13, and having a nut 14 threaded on its outer end. The rod 12 extends through a bore 15 in the upper portion of a forked bracket 16, the said bracket being maintained on the rod by the nut 14. A coil spring 12' encircles the rod between the bracket 16 and the collar 13, the said spring being in compressed condition so that it bears tightly against the bracket.

The lower ends of the bracket 16 are pivotally connected to the sides of a motor housing 17 as at 18, there being rubber washers 16' encircling the pivot pins 18 between the ends of the brackets and the sides of the casing, the said washers serving to eliminate noise and also serving as a friction lock to hold the casing in a position of adjustment such as shown in Fig. 1. Within said housing an electric motor 19 is positioned. The inner end of the motor housing is enlarged and cup-shaped as at 20, said enlarged portion extending outwardly on each side of the housing proper and also extending therebelow. Adjacent the point of connection between the housing proper and the enlarged portion are air intake openings 21.

Mounted within the cup-shaped portion 20 is a disk 22 constructed of suitable insulating material, having a central opening 23 through which an end of the motor 19 extends, and having a plurality of ring shaped projections 24 which define channels. Within said channels are heating coils 25, 26 and 27. On an outwardly projecting portion of a shaft 28 of the motor 19 a fan 29 is mounted, the said fan being rotatable closely adjacent to the circular heating coils, as shown, to quickly and effectively circulate the heat radiating therefrom.

A cover 30, having a lower spout-shaped portion 31 provided with a discharge opening 32, fits within the cup-shaped extension of the motor housing. Bolts 33, secured to the sides of said cover, extend through apertures in the housing portion 20. Nuts 34, which are threaded on said bolts serve to removably hold the cover in position.

A knob 35, on the exterior of the motor housing controls the operation of the motor and the heating coils. The said knob is in connection with a switch 36 (see Fig. 5) having contact points 37, 38, 39 and 40 thereon. By turning the knob so that the contact 37 is engaged, the motor 19 will be set in operation. By turning the knob one step further to bridge both the contacts 37 and 38, the circuit will be completed to the motor and to the inner heating coil 27. Upon further manipulation of the switch one or both of the remaining heating coils may also be brought into operation. Thus, by the novel controlling mechanism, the amount of heat which is to be utilized may be varied to suit different conditions.

In operation, the knob 35 is turned, as above explained, to start the motor and to complete the circuit to one or more of the heating coils, and cold air, drawn in through the openings 21 of the casing, is heated by said coils. Due to the novel arrangement and position of the coils in close proximity to the fan 29 whereby the fan blades sweep past all portions of the outer surface of the coils, the heated air currents will be circulated very quickly and effectively, with little or no loss of heat before the air currents are discharged from the casing. The forced air will be directed by the spout 32 downwardly adjacent the vehicle windshield to dispel frost and condensation therefrom so that the driver will have clear vision. Inasmuch as the forced downward movement of the heated air is opposite to the natural rising movement of a heated medium, when said air reaches the lower portion of the windshield, the force imparted to it by the fan will be lost and the air currents will rise, and again sweep the surface of the windshield. Thus there will be a double movement of the heated air currents with a resulting increase in efficiency of the device.

If it is desired to direct the air currents at an angle along the windshield, the housing is moved on the rod 12 as shown by the dotted lines in Fig. 2, the spring 12', which bears against the upper portion of the bracket 16, holding the device in adjusted position. A further adjustment may be made by swinging the housing on the pivot pins 18, as shown by the dotted lines in Fig. 1, to direct the air currents at a slight angle away from the windshield.

Although only one form of the invention has been shown and described, it is not desired to be limited to this particular showing, as the broad concept of the invention includes all changes and modifications as may come within the scope of the claims.

While my invention has been described as particularly applicable for keeping automobile windshields clear of snow, ice or the like, yet I do not wish to restrict myself to that particular use, inasmuch as it is obvious that the invention is equally applicable for use generally in connection with window panes, or the like, without departing from the spirit and scope of the invention.

What I claim is:

1. A heater for windshields, or the like, comprising a motor housing, a casing adjacent the motor housing and in line therewith, said casing provided with an intake opening to admit the air to be heated, and also having an air outlet opening for the discharge of the heated air, a heating unit within the casing having an opening to provide for the motor shaft projecting into said casing, a fan within the casing mounted on the motor shaft and rotatable in a plane parallel to the planes of the heating unit and the windshield and adapted to force the air heated by the heating unit through the outlet opening of the casing and against the face of the windshield, means for adjusting the casing and connected housing toward and away from the windshield, a bracket connected to and extending upwardly from the upper portion of the housing and provided at its upper end with an opening and a rod projecting inwardly from the windshield casing, and passing loosely through the eye of the bracket, whereby the motor housing and the connected casing may swing in a plane corresponding to the plane of the windshield.

2. A heater for windshields, or the like, comprising a motor housing, a casing adjacent the motor housing and in line therewith, said casing provided with an intake opening to admit the air to be heated, and also having an air outlet opening for the discharge of the heated air, a heating unit within the casing having an opening to provide for the motor shaft projecting into said casing, a fan within the casing mounted on the motor shaft and rotatable in a plane parallel to the planes of the heating unit and the windshield and adapted to force the air heated by the heating unit through the outlet opening of the casing and against the face of the windshield, a bracket pivotally connected to the upper portion of the motor housing and extending upwardly therefrom, and a rod extending inwardly from the windshield frame and connecting with the upper end of the bracket, the pivot of the bracket permitting the motor housing and the casing to be adjusted closer to or further away from the windshield.

3. A heater for windshields, or the like, comprising a motor housing, a casing adjacent the motor housing and in line therewith, said casing provided with an intake opening to admit the air to be heated, and also having an air outlet opening for the discharge of the heated air, a heating unit within the casing having an opening to provide for the motor shaft projecting into said casing, a fan within the casing mounted on the motor shaft and rotatable in a plane parallel to the planes of the heating unit and the windshield and adapted to force the air heated by the heating unit through the outlet opening of the casing and against the face of the windshield, a bracket pivotally connected to the upper portion of the motor housing and extending upwardly therefrom and provided at its upper end with an eye, and a rod projecting inwardly from the windshield frame and passing loosely through the eye of the bracket, whereby the motor housing and the casing may swing on the bracket pivot in a plane toward and away from the windshield, and can be swung on the rod in a direction corresponding to the plane of the windshield.

HENRY C. FIEGE.